United States Patent
Clare et al.

Patent No.: US 6,342,985 B1
Date of Patent: Jan. 29, 2002

(54) METHOD AND APPARATUS FOR IMPROVING DISK DRIVE SEEK PERFORMANCE

(75) Inventors: Donald Lee Clare, Morgan Hill; Troy Tse-Quong Lee; Louis Joseph Serrano, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,504

(22) Filed: Sep. 15, 1998

(51) Int. Cl.[7] .............................. G11B 21/02
(52) U.S. Cl. ................... 360/75; 360/78.12
(58) Field of Search ............... 318/560, 561, 318/569, 431, 434, 445, 439; 360/78.04, 78.09, 78.12, 75

(56) References Cited

U.S. PATENT DOCUMENTS

| | | | |
|---|---|---|---|
| 3,753,245 A | 8/1973 | Ruble et al. ........... 340/174.1 B |
| 3,775,655 A | 11/1973 | Du Vall ....................... 318/634 |
| 4,207,601 A | 6/1980 | Desai et al. .................... 360/78 |
| 4,679,103 A | 7/1987 | Workman ..................... 360/77 |
| 4,835,633 A | 5/1989 | Edel ........................... 360/78.12 |
| 5,005,089 A | 4/1991 | Thanos et al. ............ 360/77.08 |
| 5,084,791 A | 1/1992 | Thanos et al. ............ 360/77.04 |
| 5,119,250 A | 6/1992 | Green et al. ............. 360/78.06 |
| 5,128,813 A | 7/1992 | Lee .......................... 360/78.07 |
| 5,268,804 A | 12/1993 | Wallis ...................... 360/78.04 |
| 5,270,885 A | 12/1993 | Satoh et al. .............. 360/77.04 |
| 5,305,160 A * | 4/1994 | Funches et al. ....... 360/78.09 X |
| RE35,302 E | 7/1996 | Hoshimi et al. ......... 360/77.11 |
| 5,594,603 A * | 1/1997 | Mori et al. .............. 360/78.04 |
| 5,898,286 A * | 4/1999 | Clare et al. ................. 318/569 |
| 5,912,782 A * | 6/1999 | Lee et al. ................ 360/78.09 |

* cited by examiner

Primary Examiner—David Hudspeth
Assistant Examiner—K. Wong
(74) Attorney, Agent, or Firm—Altera Law Group, LLC

(57) ABSTRACT

A system and method for compensation for variation in a voice coil motor's torque factor due to changes in temperature to improve the seek performance of a disk drive. The method uses the numerical relationship between change in torque factor and change in temperature (G) for the voice coil motor, combined with torque factor $K_T$ and temperature at/near the voice coil motor measured at a first time (for example during the initial start-up of the disk drive during the automatic recalibrations that is performed during a start-up, ($K_{T\,RECAL}$) and ($T_{RECAL}$) respectively). These $K_{RECAL}$ and $T_{RECAL}$ can be stored in memory. At some later predetermined interval or event, the temperature at or near the voice coil motor is again measured ($T_{EVENT}$). From these known temperature and torque factor parameters, in combination with the known relationship between temperature and torque factor for the voice coil motor, the $K_T$ at the future time/event ($K_{T\,EVENT}$) can be calculated. This new $K_T$ $_{EVENT}$ has been adjusted for temperature and can now be used in the seek algorithm in place of the original $K_{T\,RECAL}$ which results in more optimal seek performance.

22 Claims, 3 Drawing Sheets

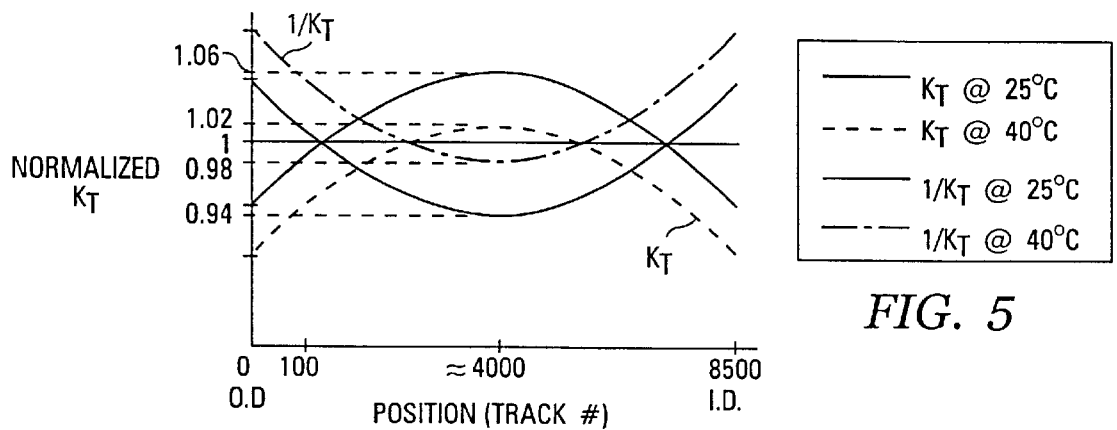
*FIG. 5*
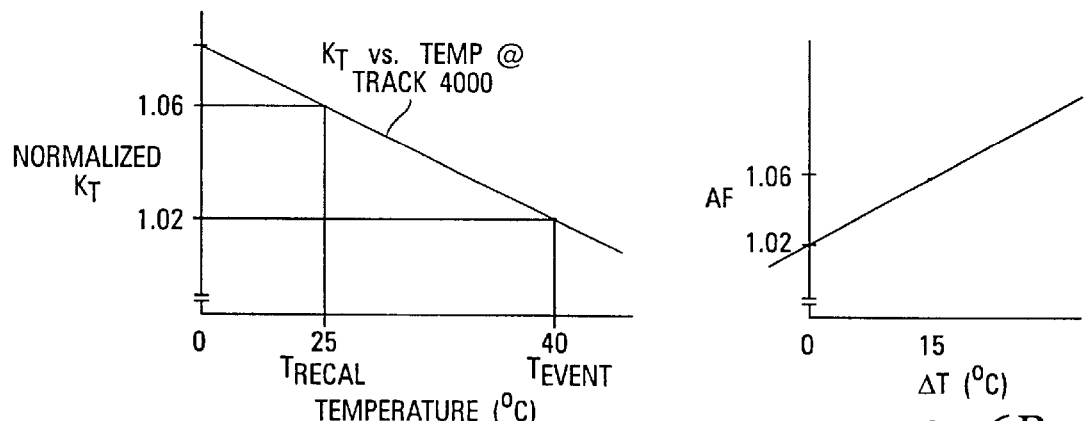
*FIG. 6A*
*FIG. 6B*
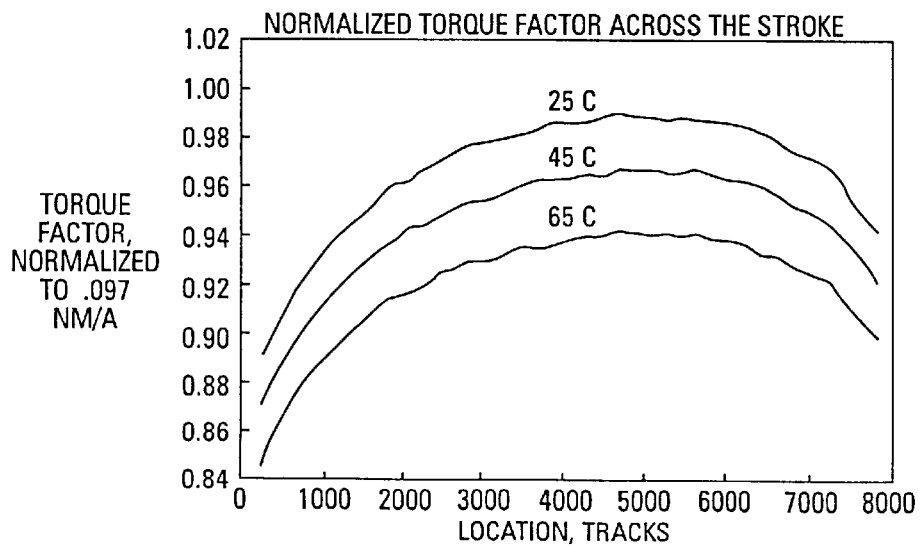
*FIG. 7*

METHOD AND APPARATUS FOR IMPROVING DISK DRIVE SEEK PERFORMANCE

FIELD OF THE INVENTION

The present invention pertains to the field of disk drives. More particularly, this invention pertains to a method and apparatus for adjusting the torque constant of the disk drive voice coil motor to compensate for changes in temperature between calibrations in order to improve seek performance for a disk drive.

BACKGROUND OF THE INVENTION

One of the key components of a computer system is a place to store data. Typically computer systems employ a number of storage means, including a disk drive which is also called a direct access storage device (DASD). A disk drive or direct access storage device includes several disks stacked on a spindle. The disks are mounted to the spindle in a spaced apart relation so that the separate disks do not touch each other. Both sides of each disk are generally used to store data.

Each disk surface is divided into portions where data is stored. There are a number of tracks situated in concentric circles, and each track in a disk drive is further subdivided into a number of sectors which is essentially just one section of the circumferential track. Disks in a disk drive are made of a variety of materials. Most commonly, the disk is made of metal or plastic. To store and retrieve data on a disk, a magnetic transducer known as a read/write head is passed over the surface of the disk.

There are two types of disk drives, rotary and linear, both of which have an actuator that holds all the transducers or read/write heads. The actuator arms move so that the read/write heads attached to the actuator arm move to locations over various tracks on the disk. Attached to the actuator arm is a coil, most commonly known as a voice coil. The voice coil and the magnets associated with it are the major portions of a motor, known as the voice coil motor, which is used to move the actuator arm.

Increasing the speed at which data can be located and retrieved using a seek operation is very desirable in a disk drive or direct access storage device. In order to optimize the seek performance of a disk drive, it is important to accurately model the various parameters within the disk drive. One of these parameters is the torque factor ($K_T$) of the voice coil motor. In many disk drives, this $K_T$ parameter, or its inverse ($1/K_T$) which is referred to as the compensation or adjustment factor, is used within the seek algorithm to aid optimization of the performance and reliability of the seek function. For example, the torque factor $K_T$ can and does change as a function of the position of the voice coil motor heads (i.e., which track of the disk drive over which the head is positioned). This relationship forms a curve of normalized torque factor versus disk position (the "$K_T$ curve"). This $K_T$ curve is commonly determined during the manufacture of the disk drive.

One of the ways to optimize seek operations of a disk drive is to adjust the $K_T$ curve by an adjustment factor during operation. Typically, this adjustment will occur during a recalibration of the disk drive or during start-up of the disk drive. This adjustment factor during recalibration or start-up ($AF_{RECAL}$) is used to adjust the $K_T$ curve for changes that have occurred during disk drive operation since the last recalibration. The operation of a general disk drive and control system during track seeking and track following (the seek operation) can be found in U.S. Pat. Nos. 4,679,103 and U.S. Pat. No. 4,835,633, issued to International Business Machines Corporation, which are incorporated by reference herein.

The $K_T$ for a disk drive voice coil motor can also change as a function of temperature within the disk drive plant. Typically, as temperature increases the $K_T$ of the voice coil motor decreases (due to the effect of increased temperature on the magnets within the voice coil motor). Thus, if no corrective action were taken, the seek time of the disk drive would increase as the temperature within the disk drive plant increased.

Providing $K_T$ values that have been further adjusted based on changes in temperature would provide a more optimized seek functional. However, it is very difficult or sometimes impossible to measure the $K_T$ during normal operation of the disk drive. Currently, the $K_T$ and/or temperature changes are compensated for during recalibrations of the disk drive. Recalibrations within a disk drive to adjust for important plant factors, such as sensor gain and torque factor, occur at certain times as defined in the microcode operating the disk drive. Recalibrations are very typically done automatically upon the occurrence of certain events such as start up of the disk drive and during automatic recovery operations. Existing disk drives can use the recalibrated $K_T$ within the seek algorithm to more accurately model the disk drive.

This prior method of recalibration in order to compensate for torque constant for changes in temperature has several disadvantages. One of the disadvantages is that performing a recalibration is a relatively difficult and time-consuming operation that interrupts the general flow of data to/from the disk drive and decreases the overall disk drive performance. Performing a recalibration specifically for changes in temperature, while increasing seek performance, would reduce the overall performance of the disk drive.

SUMMARY OF THE INVENTION

The present invention provides an improved torque factor correction system and method that substantially eliminates or reduces disadvantages and problems associated with previously developed systems and methods used for compensating a voice coil motor torque factor due to changes in temperature.

More specifically, the present invention provides a system and method for compensation for variation in voice coil motor torque factor due to changes in temperature to improve the seek performance of a disk drive.

As previously discussed, the curve relating torque factor to position, or the $K_T$ curve, is determined during manufacture and can be adjusted at each recalibration or at each start-up operation by an adjustment factor ($AF_{RECAL}$). The $AF_{RECAL}$ can be used to adjust the $K_T$ curve for changes that have occurred during disk drive operation.

The system and method of the present invention further improve the seek operation by further adjusting the $K_T$ curve compensation for changes in temperature during operation of the disk drive without having to perform a recalibration. The present invention uses a numerical relationship between change in torque factor and change in temperature (G) for the voice coil motor, combined with the torque factor adjustment and temperature at/near the voice coil motor measured at a first time (for example during the initial start-up of the disk drive during the automatic recalibrations that is performed during a start-up), $AF_{RECAL}$ and $T_{RECAL}$ respectively, to determine an adjustment factor ($AF_{EVENT}$) that is used to adjust the most recent $K_T$ curve for temperature changes during operation. The $A_{RECAL}$ is simply an adjustment of the curve that relates torque factor to position.

The $AF_{RECAL}$ and $T_{RECAL}$ are stored in memory. At some later predetermined interval or event, the temperature at or near the voice coil motor is again measured (i.e., "$T_{EVENT}$"). From these known temperature and torque factor adjustment parameters, in combination with the known relationship between temperature and torque factor (G) and position and torque factor ($K_T$ curve) for the voice coil motor, a temperature-compensated adjustment factor at the future time/event ($AF_{EVENT}$) can be calculated. This new $AF_{EVENT}$ can be applied to the $K_T$ curve to provide a temperature-compensated $K_T$ curve that has been adjusted for temperature. $K_T$ values from this new $K_T$ curve are now used in the seek algorithm in place of the original $K_T$ values to provide more optimal seek performance.

The present invention provides an important technical advantage of improving the seek performance for disk drives without having to perform a recalibration operation.

The present invention provides another technical advantage by reducing the number of seek errors.

The present invention provides yet another technical advantage by providing an improved seek performance of the disk drive after changes in temperature, as compared to the seek performance of the disk drive without any temperature compensation.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 5 is an illustrative graph of normalized $K_T$ versus disk drive head position for a typical disk drive;

FIG. 6A is an illustrative graph of normalized $K_T$ versus temperature at track 4000 of the disk drive of FIG. 5;

FIG. 6B is an illustrative graph of the torque factor versus change in temperature at track 100 for the disk drive of FIG. 5;

FIG. 7 is a graph of normalized torque factor versus position on the disk drive for three temperature readings for a disk drive.

DETAILED DESCRIPTION OF THE PREFERRED EMBODIMENT

Figure 1:
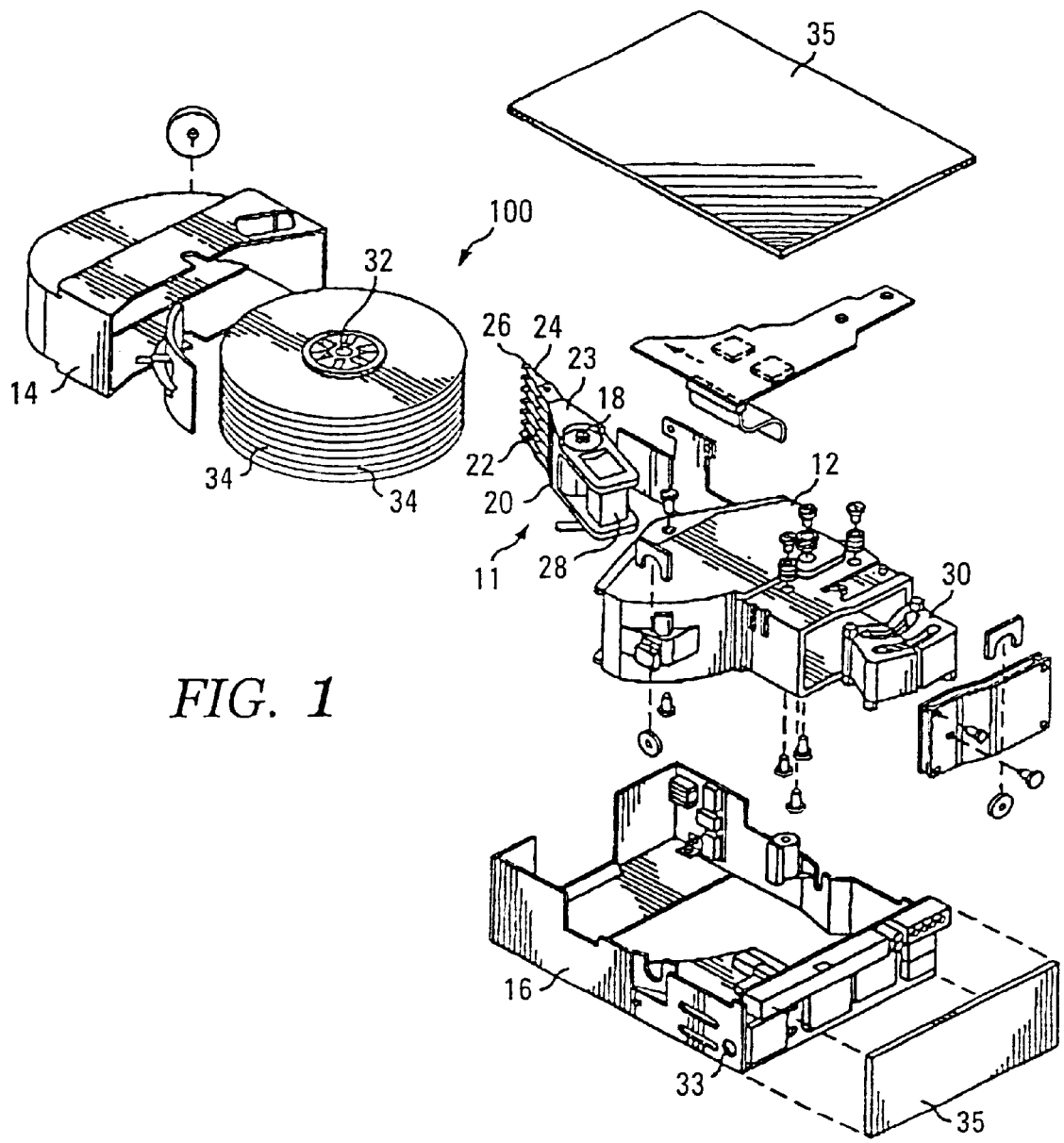
FIG. 1 shows an exploded view of a typical disk drive.

The invention described in this application is useful with all mechanical configurations of disk drives or direct access storage devices, including optical disk drives, including any number of disks. FIG. 1 is an exploded view of a disk drive 100 (or plant 100). It should be noted that although a rotary actuator is shown the invention described herein is equally applicable to linear actuators. The disk drive 100 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring 24 is a slider 26 which carries a magnetic transducer (not shown in FIG. 1). On the other end of the actuator arm assembly 20 opposite the load springs 24 and the sliders 26 is a voice coil 28.

Voice coil motor 11 includes voice coil 28 and a pair of magnets 30 within housing 12. The voice coil motor 11 applies a force to the actuator assembly 20 to rotate it about the actuator shaft 18 when performing a seek operation. Also mounted within the housing 12 is a spindle shaft 32. Rotatably attached to the spindle shaft 32 are a number of disks 34. As shown in FIG. 1, the disks 34 are attached to the spindle shaft 32 in spaced apart relation. The disk drive 100 shown in FIG. 1 also includes a temperature sensor 33 that is electronically attached to printed circuit card 35. The printed circuit card 35 and temperature sensor 33 work in concert to measure and report temperature within or attached to housing 12 of the plant 100, and specifically the temperature of the magnets 30 of voice coil motor 11. Temperature sensor 33 is preferably located at a position that will most accurately detect changes in temperature at or very near the magnets 30 within voice coil motor 11. The temperature sensor 33 can include bandgap temperature detectors or other temperature sensors suitable to detect temperature within the plant 100.

Figure 2:
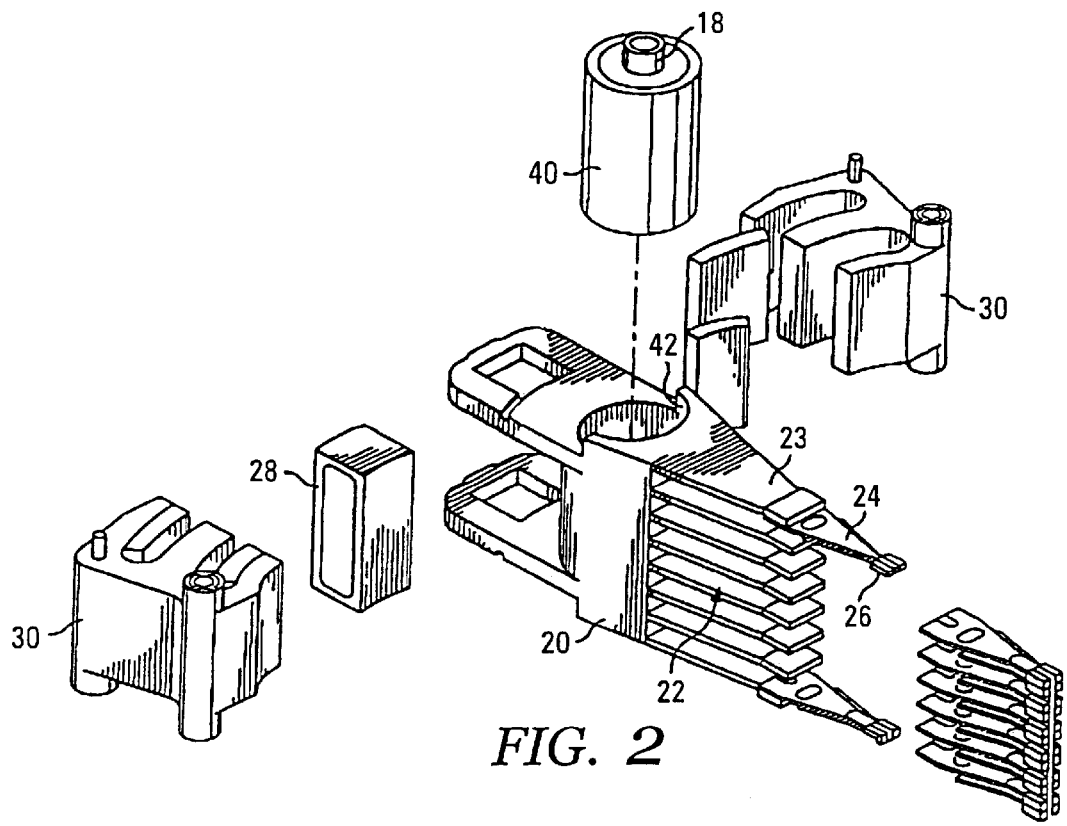
FIG. 2 shows a detail exploded view of an actuator assembly of the disk drive of FIG. 1.

FIG. 2 details the actuator arm assembly 20 in an exploded view, including the magnets 30 and the voice coil 28 that are key components of voice coil motor 11. Voice coil motor 11 is used to apply a force to the actuator assembly 20 and rotate the actuator assembly 20 about the actuator shaft 18 of a bearing cartridge 40. The bearing cartridge can be cylindrical in shape and includes the actuator shaft 18 about which the actuator arm assembly rotates. The actuator arm assembly 20 has a first opening or bore 42 therein. The bearing cartridge 40 fits within the bore 42 in the actuator arm assembly 20. Each voice coil motor 11 has a torque factor ($K_T$) associated with it that can vary as temperature varies.

The disk drive 100 includes both mechanical and electrical components, various electrical circuits, and microcode. The disks 34 rotate on spindle shaft 32 which is powered by a motor. Information is written on or read from the disks 34 by means of heads or magnetic transducers 27 which are attached to sliders and which are positioned by the actuator arm assembly 20. The actuator assembly 20 moves in response to current from a driver which receives an actuator control signal generated by microcode. The control signal is typically a voltage signal that the drive circuit converts to a current level through the voice coil. Disk drives have two methods for determining positions, namely dedicated servo and sector servo. This invention would be equally applicable to disk drives which use either method for determining position of the magnetic transducer.

The present invention provides a system and method for compensating torque factor in voice coil motors for changes in temperature without having to re-perform the calibration of the disk drive. An adjustment factor that adjusts the voice coil motor torque factor/position curve (the "$K_T$ curve") can be calculated based on a temperature/torque factor relationship (G) of the voice coil motor. By using the temperature/torque factor relationship (G) of the voice coil motor and temperature measurements taken during voice coil motor operation, the benefit of improved seek performance derived from a recalibration can be attained without actually requiring the time-intensive recalibration operation. Thus, the present invention can improve seek performance after temperature increases or decreases within the disk drive, as compared to a disk drive that does not incorporate this invention. While the actual seek performance may fall off as temperature increases in the disk drive, the seek performance will nonetheless be better than if the present invention was not in use.

A relationship exists between the torque factor $K_T$ and position for voice coil motors 11 (such as those used in disk drives). This relationship between torque factor and position is referred to herein as the "$K_T$ curve". This $K_T$ curve is commonly adjusted during recalibration of the disk drive to increase the seek performance of the disk drive. The present invention further adjusts this $K_T$ curve during operation (i.e., in the absence of another recalibration) for changes in temperature within the disk drive.

A relationship also exists between $K_T$ (and therefore the $K_T$ curve) and temperature for voice coil motors 11. For any voice coil motor 11, this relationship between $K_T$ and temperature can be determined. The voice coil motor temperature/torque factor relationship, referred to herein as "G", can be derived from the physical properties of the materials used to construct the voice coil motor magnets, or alternatively, it can be determined experimentally. A determination of the temperature/torque factor relationship experimentally can be done once for a particular model of disk drive because the effect of temperature will not vary significantly from drive to drive.

A particular disk drive was experimentally determined to have a decrease in torque factor $K_T$ at each point along the $K_T$ curve of approximately 0.11% per degree Celsius increase in temperature. FIG. 7 shows a graphical representation of the relationship between change in torque factor based on change in temperature for this disk drive. As temperature within the disk drive increased, the torque factor decreased. The plots shown show the normalized torque factor of the disk drive versus track location on the disk drive at temperatures of 25, 45 and 65 degrees Celsius. As can be seen, the plots take approximately the same shape across the diameter of the disk drive from track 0 to track 8000. For this particular experiment, the disk drive operated at 25_C. had an average move time of 6.5 milliseconds. When the temperature was raised to 65_C. without performing a recalibration, the move time was increased to 7.3 milliseconds. Recalibrating the disk drive reduced the move time at 65_C. to 7.0 milliseconds. This measured data shows a decrease in torque factor of about 0.11% per degree Celsius temperature increase for the disk drive across the $K_T$ curve.

The present invention uses this relationship between the voice coil motor $K_T$ curve and temperature change (G), and combines it with temperature data taken at various times to compensate the $K_T$ used in seek algorithms to increase seek performance and reliability without having to perform a recalibration of the disk drive 100. It should be understood that while the present invention will be described for a voice coil motor 11 within a disk drive, the method of the present invention can increase the performance for any voice coil motor that operates in an environment where temperature varies.

In accordance with one embodiment of the present invention, the $K_T$ adjustment factor ($AF_{RECAL}$) can be measured at a first time, which can be, for example, during the initial start-up of the disk drive and/or during each automatic recalibration that is performed during operation. The $A_{RECAL}$ is stored in memory. This $AF_{RECAL}$ is an adjustment factor that is used to adjust the torque factor to position relationship of the voice coil motor 11 and can be used to adjust the $K_T$ curve to more accurately perform seek operations. It should be understood that the present invention does not require the use of an $A_{RECAL}$ to adjust the $K_T$ curve, but can work in conjunction with the $A_{RECAL}$. In essence, the $A_{RECAL}$ can be used during recalibration to adjust the $K_T$ curve as is currently done in many disk drives, while the present invention provides another adjustment factor ($AF_{EVENT}$) that can be used during disk drive operation to further adjust the $K_T$ curve to compensate for temperature changes between disk drive recalibrations.

During each recalibration operation (or at certain time periods), temperature sensor 33 measures the temperature at or near the voice coil motor 11 and records that temperature ($T_{RECAL}$). At some future time (such as a predetermined time interval) or prompted by some future event, the temperature sensor 33 determines the temperature at or near the voice coil motor 11 ($T_{EVENT}$). From these known parameters of $K_T$ curve, temperature at recalibration and at a later event, and the relationship between temperature and $K_T$ for the voice coil motor (G), the present invention can calculate an adjustment factor at the future time/event ($AF_{EVENT}$). This new adjustment factor $AF_{EVENT}$ can be used to adjust the $K_T$ curve for changes in temperature since the last recalibration of the disk drive to provide more optimal seek performance. Thus, the disk drive seek algorithm is adjusted as though a recalibration had been performed and torque factor had been determined under the new temperature conditions. Measuring the temperature during operation at/near the voice coil motor can be ongoing in order to continuously provide new $AF_{EVENT}$ adjustment factors to update the $K_T$ curve values to continuously provide improved seek performance and reliability.

Figure 3:
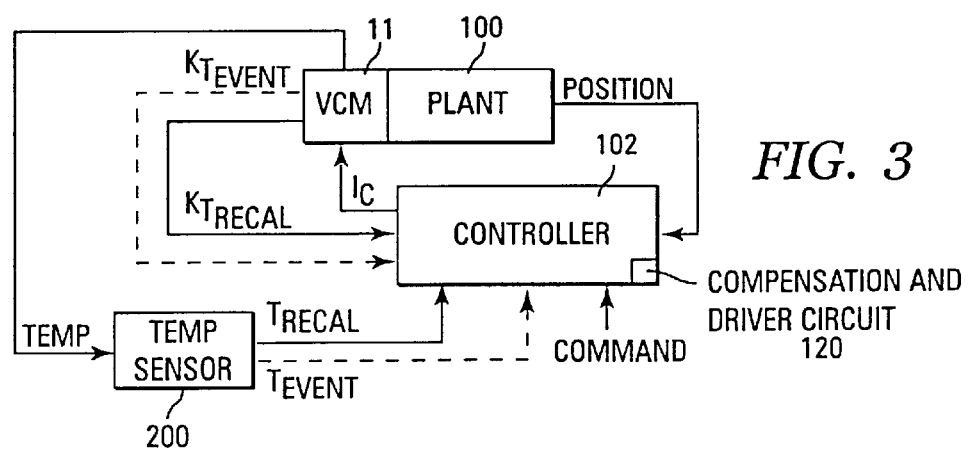
FIG. 3 is a block diagram schematic of a disk drive positioning system with a torque factor compensation for changes in temperature in accordance with the present invention.

FIG. 3 shows a block diagram schematic of one embodiment of the present invention incorporated into a disk drive plant 100. The plant 100 is electrically connected to a controller 102 that receives from the plant 100 a position reading for the actuator arm 20 controlled by the voice control motor 11 within plant 100. The controller 102 receives commands to access positions or tracks within the disk drive storage media. Upon receiving such a seek command, the controller 102 will initiate a seek for the requested position and will move the voice coil motor 11 by generating a coil current to the voice coil motor 11 according to a seek algorithm. The controller 102 can adjust the amount of coil current actually sent to the voice coil motor by a compensation factor $1/K_T$ that adjusts the amount of current sent to the voice coil motor 11 based on what position on the disk drive is requested.

FIG. 5 can further illustrate the use of the adjustment factor $1/K_T$. FIG. 5 shows an illustrative graph of two $K_T$ curves and two $1/K_T$ curves for a disk drive, where the nominal torque factor for the exemplary disk drive of FIG. 5 is 1.0. Every disk drive will potentially have a different nominal torque factor value. As shown in FIG. 5, the torque factor generally follows a curve that increases from the outer diameter at track 0 to a peak at approximately half way through the disk drive at track 4000, then decreases in value until the inner diameter at track 8000.

FIG. 5 also shows that the $K_T$ curve for the disk drive at 25_C. is greater than and generally has the same shape as the $K_T$ curve for the disk drive at 40_C. The reason for this is that as temperature increases, the magnetic force from magnets 30 within voice coil motor 1 decreases (i.e., torque factor $K_T$ for a typical disk drive 100 will decrease as temperature increases). Also shown are the inverse curves of compensation factor $1/K_T$ at 25_C. and $1/K_T$ at 40_C. showing the opposite relationship (i.e., as temperature increases, $1/K_T$ increases).

In FIG. 5, the $K_T$ curve at 25_C. is one that has been appropriately adjusted during a recent recalibration (using an $A_{RECAL}$) where the recalibration was performed at 25_C. This temperature is recorded during the recalibration as $T_{RECAL}$. The $1/K_T$ curve at 25_C is the curve of adjustment factors (AF) that would be used during operation to appropriately adjust the coil current sent to the voice coil motor when performing a seek. As shown in FIG. 5, if a command is received at the controller 102 to move from track 4000 to track 100, as the actuator assembly moves from track 4000 closer to track 100, for a given amount of current, the amount of force is decreasing. The controller 102 can use the adjustment factor $1/K_T$ (or AF) to adjust the current applied at various times to compensate for the decreasing amount of force required as track 100 is approached.

However, as shown by FIG. 5, an increase in temperature from 25 to 40 degrees Celsius within the disk drive will change the $K_T$ curve and, therefore, will change the appropriate adjustment factor $1/K_T$ curve. For example, at track 100 at a temperature of 25_C. the normalized adjustment factor $1/K_T$ is approximately 1.02. However, as shown in FIG. 5, if the temperature rises to 40_C. the normalized adjustment factor $1/K_T$ that should be used is approximately 1.06. Presumably, during the next recalibration cycle, the adjustment factor $1/K_T$ curve will be moved to the one represented as $1/K_T$ at 40_C. However, until the next calibration, the adjustment factor curve $1/K_T$ at 25_C. will be used absent the present invention. The present invention can further compensate for temperature changes to allow the use of a compensation factor $1/K_T$ that is 1.06, rather than the 1.02 adjustment factor.

FIG. 6A shows an illustrative graph of the normalized torque factor at a fixed position on the disk drive versus temperature for the disk drive of FIG. 5. As shown in FIG. 6A, a recalibration at 25_C., as indicated by $T_{RECA1}$, has a corresponding $K_{T\,RECAL}$ of 1.06. This can also be seen at FIG. 5 as occurring near the peak of the $K_T$ curve at 25_C., or approximately at track 4000. FIG. 6A also shows a plot labeled "$K_T$/Temp" that shows an exemplary linear relationship between torque factor and temperature at track 4000 of the disk drive of FIG. 5. FIG. 6A illustrates that torque factor decreases as temperature increases for a fixed head position. In this example, the relationship G=0.267% decrease in torque value per degree Celsius increase in temperature. It should be understood that any relationship between torque factor and temperature that operates as a function of temperature change, i.e., $G(T_1,T_2)$ can be used within the present invention.

Assume a seek request is received by controller 102 when the temperature within the plant 100 has risen from 25_C. to 40_C., as indicated by the label $T_{EVENT}$. The temperature $T_{EVENT}$ can be determined at the time the seek request is made or can be continuously determined periodically at predetermined time intervals. Knowing the $K_{T\,RECAL}$ of 1.06 at a $T_{RECA1}$ of 25 C and the relationship G, the actual torque factor $K_{T\,EVENT}$ at $T_{EVENT}$=40_C. can be determined as 1.02. The "$K_T$/Temp" relationship between torque factor and temperature, $T_{EVENT}$, $T_{RECA1}$ and $K_{T\,RECAL}$ can be used to derive this value of 1.02 value for $K_{T\,EVENT}$ according to the following formula:

$$K_{T\,EVENT}=K_{T\,RECAL}-G(T_{EVENT}-T_{RECA1}).$$

The relationship G for our example of FIG. 6A is linear. Linear relationships G where the decrease in torque factor versus change in temperature can be, although not limited to, between 0.01%/_C and 5%/_C. However, it should be understood that other relationships G that may not be linear are equally encompassed by the present invention. The temperature compensation factor (TCF) at any time is determined by the torque factor to temperature relationship as a function of the temperature change. In our example, the $TCF_{EVENT}=G(T_{EVENT}-T_{RECAL})$ where G is linear. For instances where G may not be a linear function, the temperature compensation factor to be used in appropriately adjusting the $K_T$ (and therefore adjustment factor $1/K_T$) is still defined generally as $TCF_{T2}=G(T_2,T_1)$ where G is a function of changes in temperature.

Thus, for FIG. 6A, $K_{T\,EVENT}$ can be determined at ally temperature $T_{EVENT}$. Once the $K_{T\,EVENT}$ has been found, the adjustment factor $AF_{EVENT}=1/K_{T\,EVENT}$ has also been determined according to the equation:

$$AF_{EVENT}=1/K_{T\,EVENT}=1/(K_{T\,RECAL}-G(T_{EVENT}-T_{RECAL}))$$

As shown, the torque factor $K_T$ for the disk drive of FIG. 6 decreases approximately 4 percent as the temperature increased 15 degrees within the disk drive. Therefore, the adjustment factor $1/K_T$ increased this same 4 percent (as AF is simply the inverse of $K_T$). This can also be seen in FIG. 5 where the adjustment factor $1/K_T$ at 25 C. at track 4000 is approximately 0.94, while the appropriate adjustment factor $1/K_T$ at 40 C. for track 4000 is approximately 0.98. This is an increase of approximately 4%. Using this increase in 4%. at every point along the adjustment factor curve $1/K_T$ at 25 C. will result in the adjustment factor curve $1/K_T$ at 40 C. without having to perform a recalibration of the disk drive. Likewise, if the temperature rise had been less than 15 degrees, the percentage increase in adjustment factor would have been less according to the graph on FIG. 6. For example, if the temperature rise had been five degrees from 25 to 30 C., the corresponding increase in adjustment factor would have been approximately 1.3%.

FIG. 6B illustrates the resulting 4%. increase in the adjustment factor with a 15 degree increase in temperature at track 100 of the disk drive of FIG. 5. As shown in FIG. 6B, if the temperature change is zero between $T_{RECAL}$ and $T_{EVENT}$ the corresponding adjustment factor for the event is 1.02 at track 100. In other words, no further adjustment, beyond the adjustment made during the last recalibration, needs to be made to the coil current. In contrast, if the temperature change is 15 degrees C., the adjustment factor at the time of the event temperature is 1.06 (which is the 1.02 adjustment factor plus the 4%, or 0.04, for the fifteen degree increase in temperature. Thus, the compensated coil current sent to the voice coil motor will be increased by 1.06 times in order to adjust for temperature changes.

For the example of FIG. 6A, we can also determine the relationship between $K_T$ at different positions for this temperatures by dividing $K_{T\,RECAL}$ by $K_{T\,EVENT}$, or 1.06/1.02= 1.04. The temperature-adjusted coil current $I_c$ that can be sent to the voice coil motor 11 can be determined by the following equation:

$$I_c=(AF_{EVENT})\times(I_n),$$

where $I_n$ is the uncompensated coil current that would be sent to the voice coil motor without any compensation and $AF_{EVENT}$ is the adjustment factor at the time the event temperature was taken. $AF_{EVENT}$ can be approximated by $K_{T\,RECAL}/K_{T\,EVENT}$ at a fixed the disk drive.

If the coil current is also to be compensated for position based on the most recent recalibration (i.e., also adjusted using the $A_{RECAL}=1/K_{T\ RECAL}$), the temperature-adjusted, position-compensated coil current $I_c$ that can be sent to the motor 11 can be determined by the following equation:

$$I_c = (1/K_{T\ RECAL}) \times (AF_{EVENT}) \times (I_n),$$

where $I_n$ the uncompensated coil current $1/K_{T\ RECAL} = AF_{RECAL}$ is the adjustment factor measured from the last recalibration.

Data from a disk drive experiment was collected and is contained in Table 1.

TABLE 1

| Run # | Description | Normalized | Move Time Mean $K_T$ |
|---|---|---|---|
| 1 | 10000 @ 25_C | 0.994 | 6.51 ms |
| 2 | 10000 @ 65_C no recal. | 0.948 | 7.23 ms |
| 3 | 10000 @ 65_C $K_T$ adj. for T | 0.993 | 6.97 ms |
| 4 | 10000 @ 65_C w/recal. | 1.003 | 6.97 ms |

Table 1 data shows the relative advantages of the temperature compensation method and system of the present invention. Torque factor and move time data was recorded for a disk drive 100 for a thousand read seeks at 25_C. (row 1 of Table 1), for the same thousand read seeks at 65_C. without performing a recalibration (row 2, Table 1), for the same thousand read seeks at 65_C. without a recalibration using the $K_T$ as adjusted for temperature according to the present invention, and finally for the thousand read seeks at 65_C. after a recalibration (row 4, Table 1).

Figure 4:
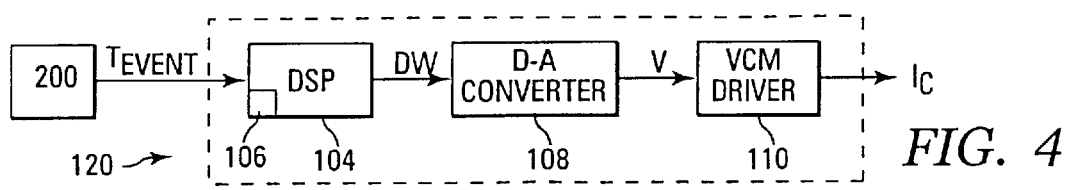
FIG. 4 is a block diagram schematic of the controller of FIG. 3.

With reference to FIG. 3, during operation the present invention uses temperature sensor 33 to first measure the temperature during each recalibration ($T_{RECAL}$) operation and stores this $T_{RECAL}$ within memory that can be accessed by the controller 102. An adjustment to the $K_T$ curve ($AF_{RECAL}$) of the voice coil motor 11 can also be measured during the recalibration and this $AF_{RECAL}$ can also be stored in memory accessible by the controller 102. The relationship between temperature change and torque factor (G) is also stored in memory accessible by controller 102. This memory containing the relationship between temperature and torque factor (G), $T_{RECAL}$, and $AF_{RECAL}$ can reside within the controller in memory 106 of digital signal processor 104 as shown in FIG. 4. It should be understood that each family of disk drives 100 can have a different $K_T$ to temperature change relationship (G). This relationship can be determined empirically for every individual disk drive 100 or, alternatively, can be statistically approximated for families or related-style disk drives 100.

Temperature sensor 33 will also measure and provide to controller 102 the temperature at or near the voice coil motor 11 at various times between recalibration operations. These temperature measurements ($T_{EVENT}$) can be taken upon the occurrence of certain events or at predetermined time intervals. For example, a new $T_{EVENT}$ could be stored in memory accessible by the controller 102 each time a seek is requested. The controller 102 uses the relationship between temperature change and $K_T$ curve(G), $T_{EVENT}$, and $T_{RECAL}$ to determine the adjustment factor ($AF_{EVENT}$) at the time $T_{EVENT}$ was measured. Controller 102 can use this $AF_{EVENT}$ to appropriately adjust the $K_T$ curve (and therefore, the compensation factor $1/K_T$) to be used within the seek algorithm when a position command is sent. Thus, at any time a position command is received, the actual compensation factor used is the compensation factor that has been adjusted by the most recent $A_{RECAL}$. Based on this most recent adjusted compensation factor, the controller 102 will cause a temperature-compensated coil current $I_c$ to be sent to the voice coil motor 11.

FIG. 4 is a schematic diagram showing the compensation and drive circuit 120 of FIG. 3 in more detail. Compensation and drive circuit 120 includes digital signal processor 104 (DSP) having memory 106 electrically connected to digital-to-analog converter 108 (D-A converter) which is further electrically connected to voice coil motor driver 110 (VCM driver).

For the embodiment shown in FIG. 4, after the controller 102 receives the position command, the DSP 104 uses an adjusted compensation factor $1/K_{T\ ADJ}$ (i.e., $AF_{EVENT}$) within the seek algorithm to determine a temperature-compensated voltage level to send as a digital word to digital-to-analog converter 108. In order to do so, DSP 104 can access from memory 106 the $K_T$ to temperature change relationship (G), the temperature at the last recalibration ($T_{RECAL}$), and, if used, the adjustment factor at the last recalibration ($AF_{RECAL}$) for the current head position. The DSP 104 also receives from the temperature sensor 33 the temperature (preferably in digital form) at the time of the request for position change ($T_{EVENT}$) or at the last predetermined time interval. Based on any change in temperature ($T_{EVENT}-T_{RECAL}$), DSP 104 can calculate the current compensation factor $1/K_{T\ ADJ}$ to be used that has been adjusted for changes in temperature.

The $T_{EVENT}$ can be determined in a number of ways. In one embodiment, the DSP 104 can receive a current $T_{EVENT}$ that is received from temperature sensor 33 shortly after receiving the position command. Thus, the temperature is updated at every seek request. Alternatively the temperature can be taken at predetermined time intervals and updated within memory 106 so that the $T_{EVENT}$ DSP 104 uses is the last temperature recorded from the ongoing temperature measurements taken at the predetermined time intervals. For example, the temperature of the plant 100 or voice coil motor magnets 30 could be taken every 15 minutes and the most recent temperature would overwrite the temperature value stored in memory 106. This alternative can reduce the burden of measuring the temperature after a seek is initiated. Alternatively, the temperature can be taken upon the occurrence of a triggering event (such as start-up or a seek error), or any combination of these times. It should be further understood that the adjustment factor $AF_{RECAL}$ can be the adjustment of torque factor to voice coil motor head position originally determined at start-up of the disk drive 100, or alternatively can be the adjustment factor determined at the most recent recalibration prior to receiving the seek operation request.

With further reference to FIG. 4, the DAC 108 can then convert the digital word representing a voltage level received from the DSP 104 to an analog voltage and sends the voltage value to a voice coil motor driver 110. The VCM driver 110 converts the voltage to a coil current $I_c$ that is compensated for any change temperature that occurred since the last update to the adjustment factor AF. The compensated coil current $I_c$ is then provided to the voice coil motor 11 to drive the voice coil motor 11 and perform the seek operation.

Although the present invention has been described in detail, it should be understood that various changes, substitutions and alterations can be made hereto without departing from the spirit and scope of the invention as described by the appended claims.

What is claimed is:

1. A method to compensate for variation in a torque factor of a voice coil motor due to changes in temperature, the voice coil motor having a relationship between change in torque factor and change in temperature (G), comprising:

measuring a first temperature ($T_1$) near the voice coil motor at a first time;

measuring a second temperature ($T_2$) near the voice coil motor at a second time;

determining a temperature compensation factor ($TCF_{T2}$), wherein $$TCF_{T2} = G(T_2, T_1);$$

and adjusting a coil current to be applied to the voice coil motor after a command to move the voice coil motor has been received using the temperature compensation factor $TCF_{T2}$ in order to compensate for temperature changes.

2. The method of claim 1, further comprising:

measuring a first torque factor ($K_{T1}$) of the voice coil at the first time;

determining a second torque factor $K_{T2}$ of the voice coil at the second time; and determining an adjustment factor $AF_{T2} = 1/(K_{T1} - TCF_{T2})$ and wherein G is linear and $TCF_{T2} = G(T_2 - T_1)$.

3. The method of claim 2, wherein measuring a first torque factor further comprises determining an entire $K_T$ curve defining a relationship between torque factor and voice coil motor position.

4. The method of claim 2, wherein adjusting the coil current further comprises multiplying an uncompensated coil current by $AF_{T2}$.

5. The method of claim 2, wherein measuring a second temperature $T_2$ further comprises periodically measuring the temperature $T_2$ near the voice coil motor and wherein determining an adjustment factor $AF_{T2}$ is accomplished using the most recently measured $T_2$.

6. The method of claim 2, wherein the voice coil motor is part of a disk drive and further wherein the first time is during a recalibration of the disk drive, the first temperature T is measured during the recalibration, and the first torque factor $K_{Tr}$ is measured during the recalibration of the disk drive.

7. The method of claim 5, further comprising:

measuring the second temperature $T_2$ at predetermined time intervals, upon initiation of a seek request, or both; and storing the most recently measured $T_2$ in a memory accessible by a disk drive controller.

8. The method of claim 5, further comprising:

measuring temperature $T_2$ upon initiation of every seek request; and storing the most recently measured $T_2$ in a memory accessible by a disk drive controller.

9. The method of claim 5, further comprising:

determining a first $K_T$ curve prior to measuring $T_1$;

determining a position compensation factor ($AF_{T1}$) during the recalibration of the disk drive;

adjusting the first $K_T$ curve during the recalibration of the disk drive using $AFT_{T1}$; and providing a temperature-compensated coil current $I_c$ to the voice coil motor where $I_c = (1/K_{T\ RECAL}) \times (AFT_{T2}) \times (I_n)$, where $I_n$ is an uncompensated coil current.

10. A method for adjusting a coil current provided to a voice coil motor of a disk drive to compensate for changes in temperature, the voice coil motor having a torque factor and a relationship between change in a torque factor and change in temperature (G), comprising:

measuring a first temperature ($T_{RECAL}$) near the voice coil motor during a recalibration of the disk drive;

measuring a first torque factor ($K_{T\ RECAL}$) of the voice coil during the disk drive recalibration;

periodically measuring a second temperature ($T_{EVENT}$) near the voice coil motor, resulting in a series of $T_{EVENT}$ measurements until a most recent $T_{EVENT}$;

storing the most recent $T_{EVENT}$ in memory accessible by a disk drive controller;

determining a temperature compensation factor ($TCF_{EVENT}$) after a seek request is received at the disk drive controller, wherein the temperature compensation factor is determined according to the equation $$TCF_{EVENT} = G(T_{EVENT}, T_{RECAL});$$

and adjusting the coil current sent to the voice coil motor using the temperature compensation factor $TCF_{EVENT}$.

11. The method of claim 10, wherein G is not a linear function.

12. The method of claim 10, further comprising determining an adjustment factor $AF_{EVENT} = 1/(K_{T\ RECAL} - TCF_{EVENT})$, and wherein G is linear and $TCF_{EVENT} = G(T_{EVEN} - T_{RECAL})$, and further wherein adjusting the coil current comprises multiplying the coil current by $AF_{EVENT}$.

13. The method of claim 12, wherein the linear relationship G comprises a percentage decrease in torque factor versus degree Celsius increase in temperature in the range of 0.01%/_C and 5%/_C.

14. The method of claim 10, wherein periodically measuring the temperature $T_{EVENT}$ further comprises measuring temperature $T_{EVENT}$ successively at a predetermined time interval, measuring the temperature $T_{EVENT}$ upon the receipt at the disk drive controller of a seek request, or both.

15. The method of claim 10, further comprising driving the voice coil motor with the adjusted coil current $I_c$, wherein the adjusted coil current $I_c$ is defined by the following equation:

$$I_c = (AF_{T\ EVENT}) \times I_n$$

where $I_n$ is an uncompensated coil current.

16. The method of claim 15, further comprising:

determining at the controller a requested coil current $I_n$ based on the seek request; and adjusting the amplifier gain within a voice coil motor driver from the requested coil current $I_n$ to the adjusted coil current $I_c$, thereby compensating for changes in voice coil motor torque factor due to changes in temperature.

17. The method of claim 10, further comprising:

determining a first $K_T$ curve prior to measuring $T_{RECAL}$;

determining a position adjustment factor ($AF_{RECAL}$) during the recalibration of the disk drive;

adjusting the first $K_T$ curve by using $AF_{RECAL}$ during the recalibration of the disk drive; and providing a temperature-compensated coil current $I_c$ to the voice coil motor where $I_c = (1/K_{T\ RECAL}) \times (AF_{EVENT}) \times (I_n)$ where $I_n$ is an uncompensated coil current.

18. A system for compensating variation in a torque, factor of a voice coil motor in a disk drive due to changes in temperature, the voice coil motor having a relationship between change in torque factor and change in temperature (G), comprising:
- a temperature sensor proximate the voice coil motor, wherein the temperature sensor measures a first temperature ($T_{RECAL}$) near the voice coil motor during a recalibration of the disk drive, and wherein the temperature sensor periodically measures a second temperature ($T_{EVENT}$) near the voice coil motor, resulting in a series of $T_{EVENT}$ measurements including a most recent $T_{EVENT}$;
- a torque factor measuring means operable to measure the torque factor ($K_{T\ RECAL}$) during the recalibration of the disk drive;
- a controller operable to receive a seek request for the disk drive and further operable to provide a coil current to drive the voice coil motor;
- a memory accessible by the controller, the memory operable to store data; and
- a temperature storing circuit operable to store the $T_{RECAL}$, the most recent $T_{EVENT}$, and the relationship G, wherein the controller uses the $T_{RECAL}$, the most recent $T_{EVENT}$, and the relationship G to determine a temperature compensation factor ($TCF_{EVENT}$) after the seek request is received according to the equation $$TCF_{EVENT}=G(T_{EVENT},T_{RECAL}).$$

19. The system of claim 18, wherein the controller further comprises:
- a digital signal processor in electrical communication with the temperature sensor, wherein the memory is a part of the digital signal processor;
- a digital-to-analog converter in electrical communication with the digital signal processor; and
- a voice coil motor driver in electrical communication with the digital-to-analog converter, wherein the digital signal processor retrieves from memory the relationship G, $T_{RECAL}$, and $K_{T\ RECAL}$ and receives from the temperature sensor the most recent $T_{EVENT}$, from which the digital signal processor calculates the temperature compensation factor $TCF_{EVENT}$, which the digital signal processor then uses to calculate adjustment factor $AF_{EVENT}$, and uses the $AF_{EVENT}$ to determine a temperature compensated digital voltage required to drive the voice coil motor and sends the digital voltage to the digital-to-analog converter, and further wherein the digital-to-analog converter converts the digital voltage to an analog voltage and sends the analog voltage to the voice coil motor driver, and further wherein the voice coil motor driver converts the analog voltage to a temperature-compensated coil current $I_c$ that is compensated for changes in temperature between the recalibration and the seek request, and further wherein the temperature-compensated coil current $I_c$ is then sent to the voice coil motor to drive the voice coil motor and perform the requested seek operation.

20. The system of claim 19, wherein the most recent $T_{EVENT}$ is measured by the temperature sensor shortly after receiving the seek request at the controller, thereby updating $T_{EVENT}$ upon every seek request.

21. The system of claim 19, wherein the most recent $T_{EVENT}$ is measured at predetermined time intervals by the temperature sensor and stored in the memory by the temperature storing circuit such that the most recent $T_{EVENT}$ retrieved by the digital signal processor is the most recent temperature recorded from the ongoing temperature measurements taken at the predetermined time intervals.

22. The system of claim 19, wherein the digital signal processor uses the $TCF_{EVENT}$ to calculate the adjustment factor $AF_{EVENT}$ according to the equation, $AF_{EVENT}=1/(K_{T\ RECAL}-TCF_{EVENT})$, where $TCF_{EVENT}=G(T_{EVENT}-T_{RECAL})$ and G is linear, and further wherein the $I_c=(AF_{EVENT})\times I_n$.

* * * * *

UNITED STATES PATENT AND TRADEMARK OFFICE
CERTIFICATE OF CORRECTION

PATENT NO. : 6,342,985 B1
DATED : January 29, 2002
INVENTOR(S) : Clare et al.

It is certified that error appears in the above-identified patent and that said Letters Patent is hereby corrected as shown below:

<u>Title page,</u>
Item [57], ABSTRACT,
Lines 10 and 11, "These $K_{RECAL}$" should read -- These $K_{T\ RECAL}$ --

<u>Column 11,</u>
Line 64, "$AFT_{T1}$" should read -- $AF_{T1}$ --
Line 66, "$AFT_{T2}$" should read -- $AF_{T2}$ --

<u>Column 13,</u>
Line 1, delete the "," after the word "torque"

Signed and Sealed this

Twenty-sixth Day of August, 2003

JAMES E. ROGAN
*Director of the United States Patent and Trademark Office*